United States Patent [19]

Kaneko

[11] Patent Number: 4,774,898
[45] Date of Patent: Oct. 4, 1988

[54] AIR INJECTION SYSTEM FOR A CULTIVATOR

[75] Inventor: Takuji Kaneko, Numazu, Japan

[73] Assignees: Fuji Robin Kabushiki Kaisha, Tokyo; Kobashi Kogyo Co., Ltd., Okayama, both of Japan

[21] Appl. No.: 855,987

[22] Filed: Apr. 24, 1986

[51] Int. Cl.⁴ .............................................. A01C 23/02
[52] U.S. Cl. ........................................................ 111/7
[58] Field of Search ...................................... 111/1–3, 111/6, 7, 37–39, 51; 172/2, 4; 47/1.43

[56] References Cited

U.S. PATENT DOCUMENTS

| | | | |
|---|---|---|---|
| 2,168,099 | 8/1939 | Hawkins et al. | 111/7 |
| 3,330,070 | 7/1967 | Ferm et al. | 47/1.43 |
| 3,331,340 | 7/1967 | Tschudy | 111/6 |
| 3,492,954 | 2/1970 | Rothfelder | 111/37 X |
| 3,621,800 | 11/1971 | Rellinger | 111/7 |
| 3,648,631 | 3/1972 | Fiedler et al. | 111/37 X |
| 3,736,890 | 6/1973 | Barnes | 111/7 |
| 4,273,056 | 6/1981 | Lofgren et al. | 111/2 |
| 4,355,688 | 10/1982 | Hamm et al. | 172/4 |
| 4,566,543 | 1/1986 | Kotani | 111/6 |
| 4,660,480 | 4/1987 | Zinck | 111/7 |

FOREIGN PATENT DOCUMENTS

| | | | |
|---|---|---|---|
| 1214463 | 4/1966 | Fed. Rep. of Germany | 111/7 |
| 57-125201 | 2/1956 | Japan | 111/7 |
| 59-29102 | 2/1984 | Japan | 111/7 |
| 59-42801 | 3/1984 | Japan | 111/7 |
| 753380 | 8/1980 | U.S.S.R. | 111/6 |

Primary Examiner—James R. Feyrer
Attorney, Agent, or Firm—Martin A. Farber

[57] ABSTRACT

A cultivator has a blade secured to a frame. The blade is downwardly projected from the frame and has an edge at the forward side thereof. An air injector is provided at a lower portion of the blade. A swing arm is provided to move in accordance with the depth of the injector in the soil. A switch produces a signal when the swing arm moves to a predetermined position at which the injector is positioned at a sufficient depth for aerating the soil. In response to the signal, a valve is opened to supply the compressed air to the injector.

7 Claims, 2 Drawing Sheets

AIR INJECTION SYSTEM FOR A CULTIVATOR

BACKGROUND OF THE INVENTION

The present invention relates to a cultivator having a blade which cultivates the soil with air injected from a nozzle or injector provided on a lower portion of the blade which is forced into the soil and moved by a tractor.

Japanese Utility Model Laid-Open Nos. 57-125201 and 59-29102, for example, disclose cultivators each provided with an aerating device, attached to a tractor by a three-point linkage. The cultivator has a long vertical blade provided with an injector at a lower portion thereof.

Such a cultivator is constructed to continuously inject compressed air from the injector at predetermined intervals. The cultivator is lowered by the three-point linkage to the surface of a field or fruit garden, and further the blade with the injector is inserted in the soil to a predetermined sufficient depth to perform desired deep cultivation. The cultivation and aeration are performed while the tractor advances. When the operation is over, the cultivator is raised by the three-point linkage above the ground.

However, if the air is injected before the blade and injector reach the predetermined depth, the compressed air will spout out with blowing up the soil. Consequently, holes are made in the field thereby affecting plants cultivated therein.

SUMMARY OF THE INVENTION

The object of the present invention is to provide an improved cultivator which can automatically detect the depth of an injector and start the aerating operation only when the injector reaches a predetermined depth, thereby preventing plants from being affected.

According to the present invention, there is provided an air injection system for a cultivator having a frame, a linkage for connecting the frame to a tractor, at least one blade secured to the frame, the blade being downwardly projected from the frame and having an edge at the forward side thereof, an injector provided at a lower portion of the blade, and a passage for supplying compressed air to the injector for injecting the compressed air into the soil.

The system comprises a detector moved in accordance with the depth of the injector in the soil, sensing means producing a signal when the detector moves to a predetermined position at which the injector is positioned at a sufficient depth for aerating the soil, a valve provided in the passage and responsive to the signal for opening the passage to supply the compressed air to the injector.

In an aspect of the present invention, the detector is a swing arm having a wheel and rotatably supported on the frame so as to vertically move in dependence on the depth of the injector, and the switch is provided to be operated by the swing arm.

The other objects and features of this invention will become understood from the following description with reference to the accompanying drawings.

DETAILED DESCRIPTION OF THE PREFERRED EMBODIMENT

Figure 1:
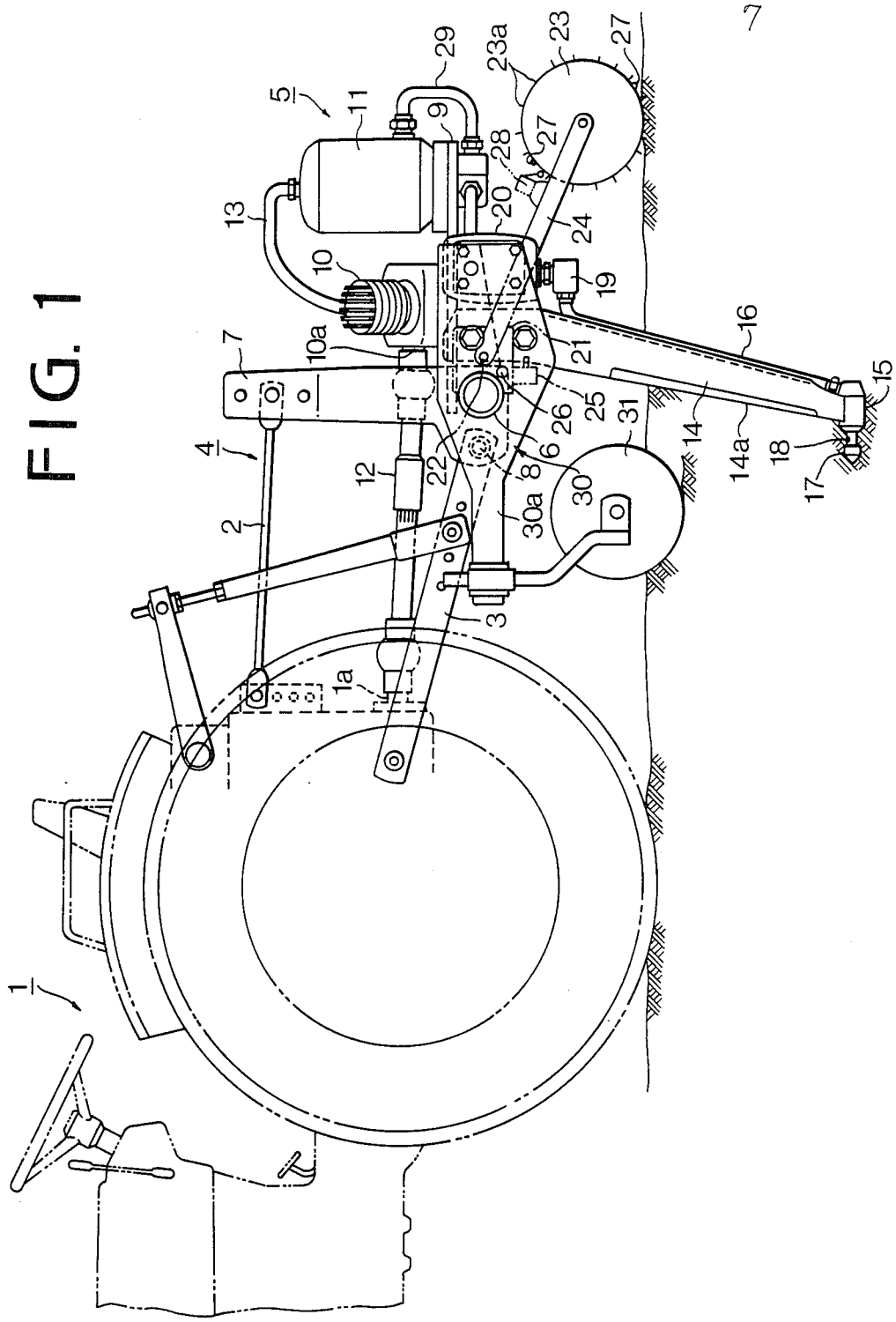
FIG. 1 is a side elevational view of a cultivator according to the present invention.

Referring to FIG. 1, a tractor 1 is provided with a three-point (hitch) linkage 4 comprising a top link 2 and a pair of lower links 3. The linkage 4 is connected to a cultivator 5 so as to lower and raise the cultivator 5.

The cultivator 5 has a frame which comprises a lateral pipe 6 and a pair of side plates 30 secured to the pipe 6.

A topmast 7 is secured to the pipe 6, and a base 9 is secured to the pipe 6 and extends to the rear of the frame. The topmast 7 is connected to the top link 2 at an upper portion and to the lower link 3 at the lower end by a lower link pins 8. Each of side plates 30 has an arm 30a extending forward and a colter 31 is provided at the end of the arm. A compressor 10 and a main tank 11 are mounted on the base 9. The tractor is also provided with a power take-off shaft 1a so as to transmit the power to input shaft 10a of the compressor 10 through a transmission system 12 comprising universal joints and a propeller shaft.

A blade 14 having an edge 14a at a front portion thereof is secured to each side plate 30, extending downwardly. The blade 14 is constructed to slightly incline toward the front. An injector 15 is secured to the lower end of each blade and an air-supply pipe 16 which communicates with the injector is fixed to the back of the blade 14. The injector 15 comprises an arrow-shaped head portion 17 having a nozzle 18 formed in an upper portion of the head portion 17 so as to upwardly inject air.

The air compressed by the compressor 10 flows through a pipe 13, is stored in the main tank 11 and is further supplied to a sub-tank 20 provided at the upper end of each blade 14 through a pipe 29. A solenoid operated valve 19 is provided between the sub-tank 22 and the pipe 16 on the blade 14. The compressor 10 and the main tank 11 may be provided closer to the tractor 1.

Secured to the pipe 6 is a rearwardly extending supporting plate 21 on which a swing arm 24 is pivotally mounted by a pin 22 so as to rotate in a vertical plane. Attached to a lower portion of the supporting plate 21 is a normally closed microswitch 25 which is closed when the swing arm 24 disengages from the microswitch at a normal operating angular position. That is, the microswitch 25 is actuated to close its contacts when the blades 14 and the injectors 15 are sufficiently inserted into the soil to a predetermined depth where the soil is not blown up by the injected air until at least the predetermined depth is reached. A stopper 26 is provided on the supporting plate 21 adjacent the microswitch 25 to prevent the swing arm 24 from rotating further after the contact with the switch 25 has been made. The swing arm 24 is provided with a gauge wheel 23 having a plurality of lugs 23a at certain intervals to prevent skidding of the wheel on the ground, and a plurality of projections 27 (two in the present embodiment) for actuating a (normally open) microswitch 28 mounted on the arm 24. Microswitches 28 and 25 are connected in series and are further connected to the solenoid operated valve 19. Thus, microswitches 25 and 28, swing arm 24 and gauge wheel 23 together construct a system for controlling the aerating operation.

The operation of the machine will be described hereinafter. The cultivator 5 is connected to the tractor 1 by three-point linkage 4 and the power of the tractor is transmitted to the input shaft 10a of the compressor 10 through the power take-off shaft 1a and the transmission system 12 so as to drive the compressor 10. The blades 14 and injectors 15 are held above the ground until the tractor reaches a field. Therefore, the microswitch 25 is against the swing arm 24 and hence in the off-state. During such a state, even if the gauge wheel 23 is accidentally rotated, the electric circuit is not closed because of the off-state of the switch 25. Accordingly, solenoid valve 19 is kept closed so that air is not injected although the compressor 10 is driven.

Figure 2:
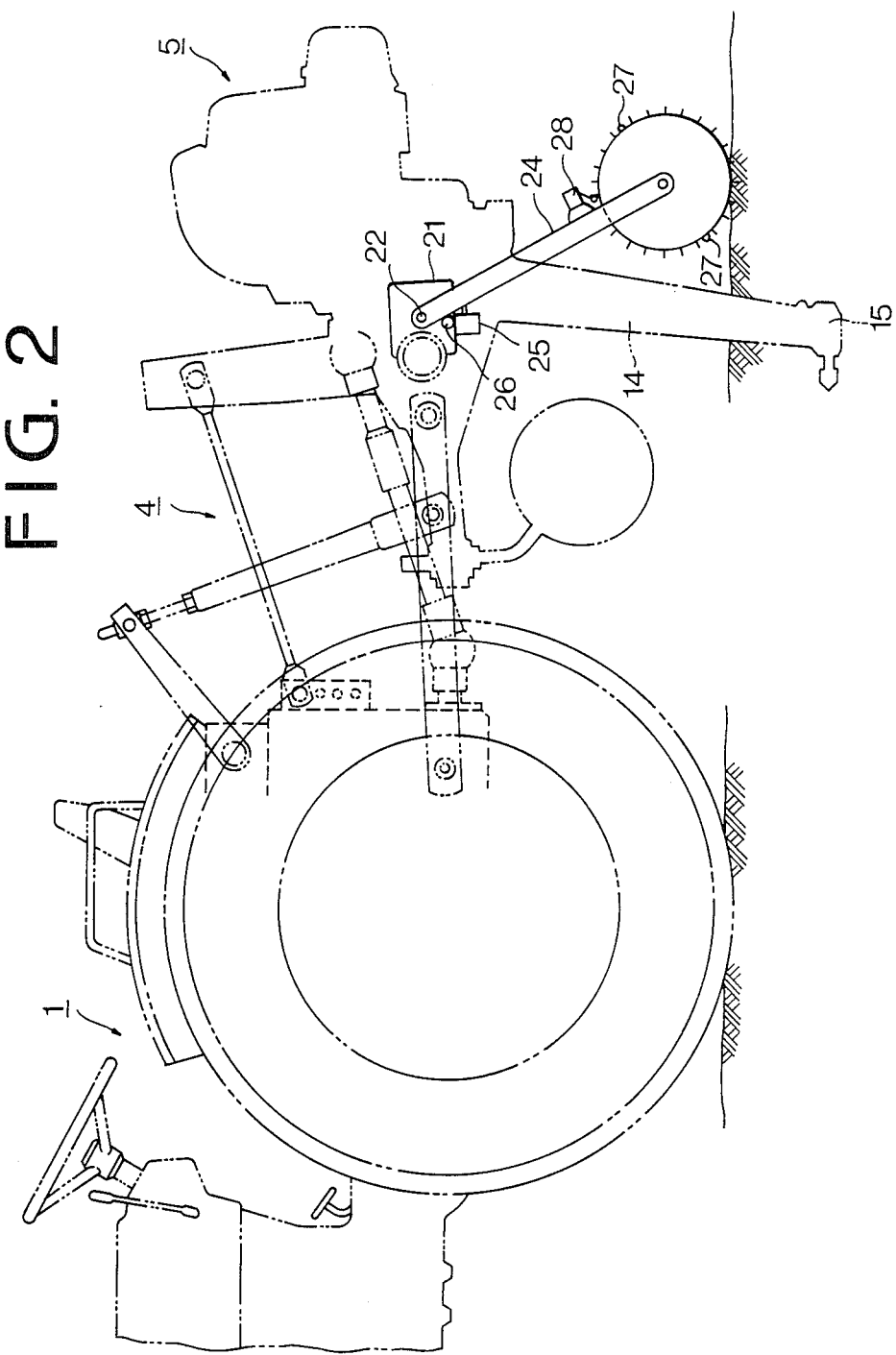
FIG. 2 is a side elevational view explaining the operation of the cultivator.

For aerating operation the cultivator 5 is lowered by the three-point linkage 4. As the cultivator 5 is tracted by the tractor 1, the blades 14 and the injectors 15 gradually plunge deeper into the soil by the weight of the cultivator. At the position shown in FIG. 2, the gauge wheel 23 touches the ground and rotates to turn the switch 28 on and off. However, the blades 14 are not inserted deep enough to turn on the microswitch 25. When the blades are inserted to a predetermined depth, the swing arm 24 disengages from the microswitch 25 to close the contacts of the microswitch 25 thereby closing the electric circuit. The gauge wheel 23 rolls on the ground so that the projections 27 turn the microswitch 28 on and off. Therefore, the solenoid operated valve 19 is opened and closed at a predetermined timing. When the solenoid operated valve 19 is opened, the compressed air in the sub-tank 20 is forcibly injected into the soil through the air-supply pipe 16, head portion 17 and nozzle 18. The colter cuts the surface of the ground a predetermined depth prior to the blade 14.

As the blade 14 cuts through the soil, the air is intermittently injected with the predetermined timing so that cracks are opened up in the deep layers of the soil. By repeating the operation, cracked areas are continuously formed and the soil is loosened. Additionally, the roots of plants in these areas are supplied with fresh air, namely oxygen.

After the aerating operation, the cultivator 5 is raised by the three-point linkage 4. When the blades 14 and injectors 15 reach the position shown in FIG. 2, the swing arm 24 again opens the microswitch 25 to open the electric circuit. Therefore, the air injection is terminated.

Although the position of the swing arm 24 is sensed by the switch 25, the position can be sensed by other means such as a linkage for operating a mechanical valve.

From the foregoing, it will be understood that the present invention provides a cultivator wherein the compressed air is injected only when the injectors are deeply inserted in the ground. Therefore, the blow up of soil which affects the plants is prevented.

While the presently preferred embodiment of the present invention have been shown and described, it is to be understood that this disclosure is for the purpose of illustration and that various changes and modifications may be made without departing from the scope of the invention as set forth in the appended claims.

What is claimed is:

1. A mobile soil injector assembly for cultivating soil by pulses of compressed air, the assembly including a frame, means for connecting the frame to a tractor for vertical adjustment, an earth cutting blade, said blade having a single forward edge to slice the soil, a source of compressed air and conduit means for delivering the compressed air through the vertical extent of the blade, the improvement comprising:

an injector head affixed to the bottom of the cutting blade, said injector head comprising a nozzle, the nozzle defined by an enlarged, leading pointed portion and an outlet portion of a diameter smaller than that of the pointed portion to reduce outlet clogging, said pointed portion and outlet portion located forwardly of said forward edge, said outlet portion having at least one upwardly directed outlet;

a swing arm, means pivotally mounting one swing arm end to the frame for vertical motion, a wheel rotatably mounted to the swing arm end opposite said one end; and control means for allowing air injection through said nozzle only when said cutting blade is positioned within the soil to a predetermined depth and at predetermined intervals as said cutting blade is drawn through the soil, said control means comprising a solenoid valve imposed in a fluid conduit means between said source of compressed air and said nozzle, a position sensing switch imposed between said swing arm and said frame, a distance sensing switch means operated by said wheel, and an electrical circuit means for communicating said position sensing switch means, said distance sensing switch means and said solenoid valve, whereby the soil will be cultivated by pulses of compressed air when said cutting blade has attained a predetermined depth and as said cutting blade is drawn through the soil.

2. The mobile injector assembly according to claim 1, further comprising
   a colter connected to the frame and located in front of the cutting blade.

3. The mobile injector assembly according to claim 2, wherein
   said colter is a disc.

4. The mobile injector assembly according to claim 1, further comprising
   a compressor, disposed on the frame, as the source of compressed air, and
   a power source for said compressor.

5. The mobile injector assembly according to claim 4, further comprising
   at least one tank mounted on the frame and communicating with the compressor for storing the compressed air from the compressor, and said solenoid valve is imposed in said fluid conduit means between said tank and said nozzle.

6. The mobile injector assembly according to claim 4, wherein
   said power source for said compressor is a power take-off unit from the tractor.

7. The mobile injector assembly according to claim 6, wherein
   said power take-off unit is a power take-off shaft of the tractor, the power take-off shaft being connected to an input shaft of the compressor via a propeller shaft.

* * * * *